United States Patent [19]

Dietterich et al.

[11] Patent Number: 4,742,206
[45] Date of Patent: May 3, 1988

[54] APPARATUS FOR LASER-MACHINING A BODY HAVING A CYLINDRICAL SURFACE

[75] Inventors: Fred Dietterich, Erkenbrechtsweiler; Dieter Butenuth, Dettingen, both of Fed. Rep. of Germany

[73] Assignee: Elcede GmbH, Kirchheim/Teck, Fed. Rep. of Germany

[21] Appl. No.: 39,212

[22] Filed: Apr. 17, 1987

[30] Foreign Application Priority Data

Apr. 25, 1986 [DE] Fed. Rep. of Germany ....... 3614082

[51] Int. Cl.$^4$ ............................................ B23K 26/00
[52] U.S. Cl. ...................... 219/121 LG; 219/121 LU; 219/121 LY
[58] Field of Search .................. 219/121 LH, 121 LJ, 219/121 LX, 121 LY, 121 L, 121 LM, 121 LC, 121 LD, 121 LN, 121 LG, 121 LU, 121 LW

[56] References Cited

U.S. PATENT DOCUMENTS 4,322,600 3/1982 Crahay .................... 219/121 LH X

FOREIGN PATENT DOCUMENTS 69091 6/1977 Japan ........................... 219/121 LH Primary Examiner—C. L. Albritton
Attorney, Agent, or Firm—Hopgood, Calimafde, Kalil, Blaustein & Judlowe

[57] ABSTRACT

A laser-cutting machine produces slots of computer-controlled size and pattern in workpieces of cylindrical-shell configuration, the workpieces being mounted for incrementally controlled rotation about the axis of each workpiece, in coordination with incrementally controlled longitudinally guided displacement of the laser along a path parallel to the workpiece-rotation axis. The thus-slotted workpieces become locators for knife elements and indentation-tool elements, so that when secured to the cylindrical body of a cutting roll, the resulting tool will find use in a rotary printing process for continuously printing, cutting and creasing cardboard or other box material. The computer-control of slot pattern enables a user shop to quickly adapt its cutting and creasing operation to the custom size and configuration requirements of different customers.

25 Claims, 3 Drawing Sheets

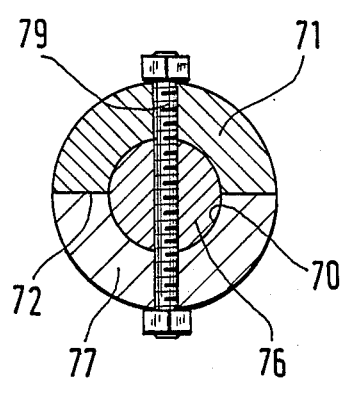
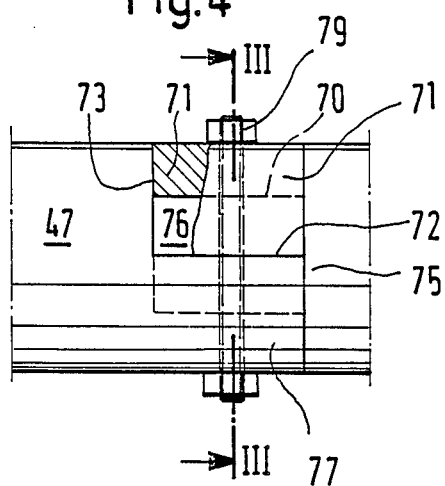
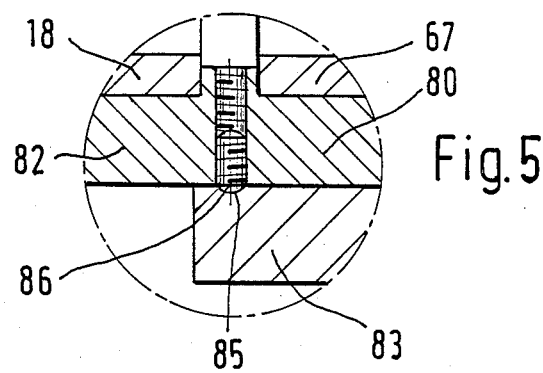
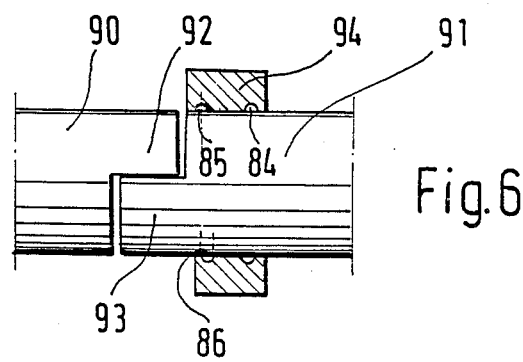

APPARATUS FOR LASER-MACHINING A BODY HAVING A CYLINDRICAL SURFACE

BACKGROUND OF THE INVENTION

The invention relates to apparatus for lasermachining a workpiece having a cylindrical surface, wherein a carrier shaft is rotatably mounted within a stand and has mounting means for the coaxial mounting of the workpiece body to the carrier shaft, and wherein the apparatus includes a linear guide for the laser, said guide being parallel to the axis of the carrier shaft, and a rotary drive for the carrier shaft, with synchronizing control for positioning drive of the laser along its guide, in coordination with controlled rotation of the carrier shaft.

Apparatus of this general character is known from European Patent No. 72,609, wherein the laser serves to produce intaglio depressions in the surface of an engraving cylinder. For this purpose, the cylinder rotates at constant speed, and the laser is displaced synchronously therewith, parallel to the axis of the cylinder. The output of the laser is controlled to develop a predetermined intaglio pattern in the course of continuous linear displacement of the laser and rotation of the cylinder.

Similar apparatus is known from U.S. Pat. No. 4,427,872 wherein a laser beam acts tangentially on a cylindrical workpiece to machine the surface of the workpiece. In this apparatus, the laser is fixed in position, and the support for the workpiece is movable along Cartesian coordinates.

BRIEF STATEMENT OF THE INVENTION

It is an object of the invention to provide apparatus of the character indicated, such that it can be used for the production of a cutting roller having inserted knife elements by means of which blanks can be cut from sheet material, for example from cardboard sheet material, as in the manufacture of folding boxes, such that the blanks can be cut out as part of a rotary-printing procedure.

It is a more specific object of the invention to provide a laser-cutting machine adapted to mount a workpiece in the form of a cylindrical shell, for rotation of the workpiece about the cylindrical axis of its shell, with computer control of laser position with respect to the workpiece, and with incremental length-measuring means governing longitudinal movement of the laser, in coordination with incremental angle-measuring means governing angular movement of the workpiece. The laser action is to cut through the workpiece to define locating slots for retention of knife elements when assembled to a cutting roller, for use in the roller-cutting of blanks from sheet material; and the machine is desirably adapted to support and machine one or more workpieces in a single operating set-up, with computer-controlled laser-displacement speed relative to the workpiece such that each slot is optimally cut through the shell of the workpiece, whatever the local direction of the cut.

A further specific object is to provide in such apparatus a capability to perform laser cuts at different workpiece diameters, but with the laser at substantially constant working offset from the workpiece, thereby, with suitable programming of the computer, enabling linear cuts of any desired direction to be produced at constant relative feeding advance of cutting action, for workpiece shells of different diameter.

Still another specific object is to meet the above objects with rotary-mounting means whereby a given workpiece or workpieces, in preassembled relation to a mandrel or carrier shaft, can be removably mounted to the machine, with keyed coaxial engagement to a rotary-drive component of the machine.

In an advantageous embodiment, the carrier shaft has two mounting wheels for the removable mounting of shell-shaped workpiece bodies. Shell-shaped bodies to be machined can be screw-fastened on the rims of the mounting wheels. In this case, an intermediate enclosed space is defined by and between the shell-shaped bodies and the carrier shaft, and this intermediate space can be advantageously used in the exhaust of gaseous products of laser-burning action, as when the workpiece is of plywood.

The gas-exhausting process is advantageously achieved by use of a tubular carrier shaft having radial openings to the space between the workpiece shells and the carrier shaft. A mounting shaft at one end of the machine has inner fluid communication with the adjacent end of the carrier shaft, and a suction hose connected to the free end of the mounting shaft enables vacuum extraction of the smoke produced by laser cutting.

DETAILED DESCRIPTION

The invention is explained in detail in the following description of illustrative embodiments shown in the accompanying drawings, in which:

FIG. 3 is an enlarged local section of a connection of shafts, taken at III—III in FIG. 1;

FIG. 4 is a fragmentary side view showing the FIG. 3 connection of shafts, and with indication of the section plane III—III;

FIG. 5 is an enlarged fragmentary detail in longitudinal section for another shaft connection, designated V in FIG. 1; and FIG. 6 is a view similar to FIG. 4, to show a modified embodiment of the involved shaft-end connection.

DETAILED DESCRIPTION OF PREFERRED EMBODIMENTS

Figure 1:
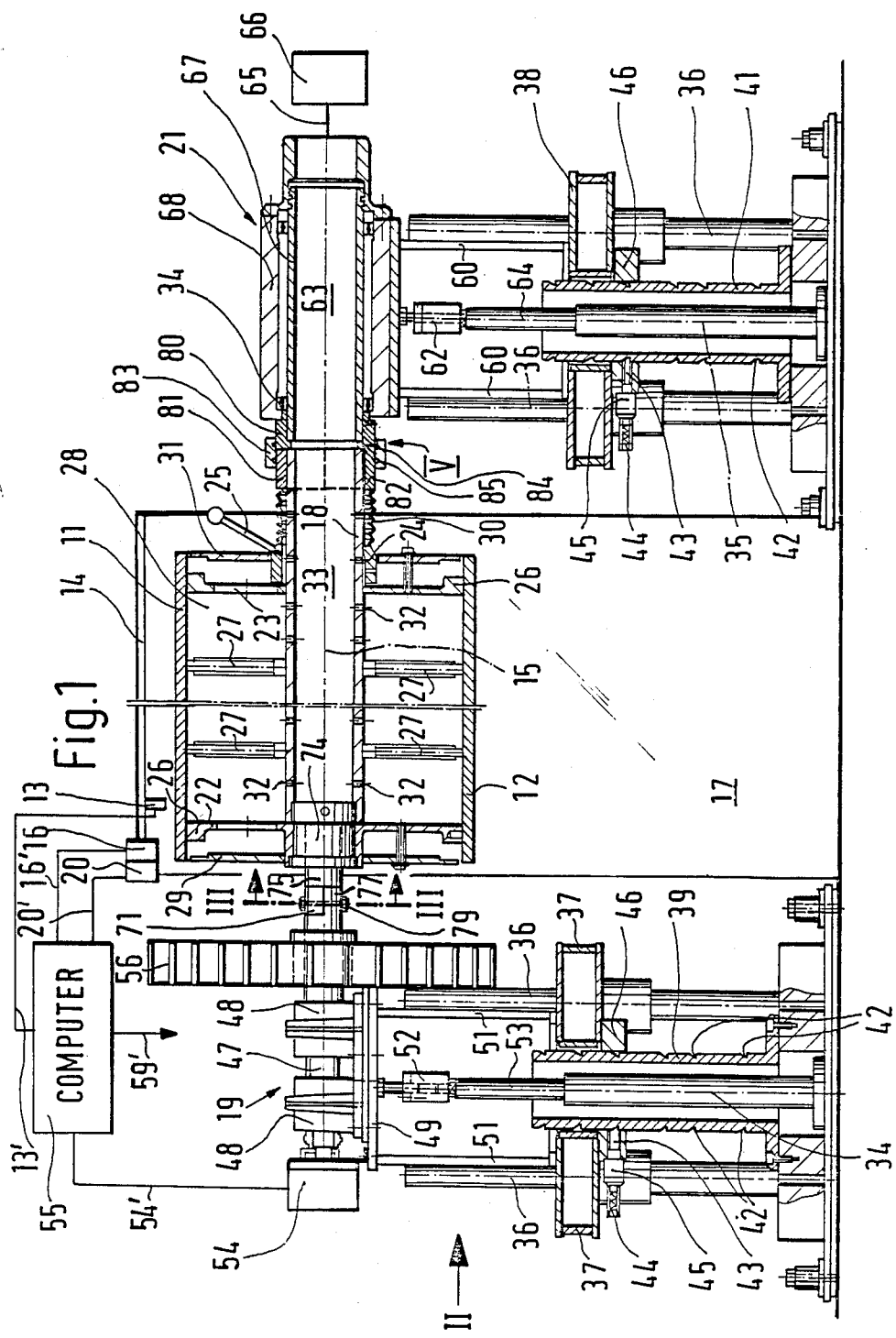
FIG. 1 is a side view in elevation for a first embodiment, shown partially in cross-section.
Figure 2:
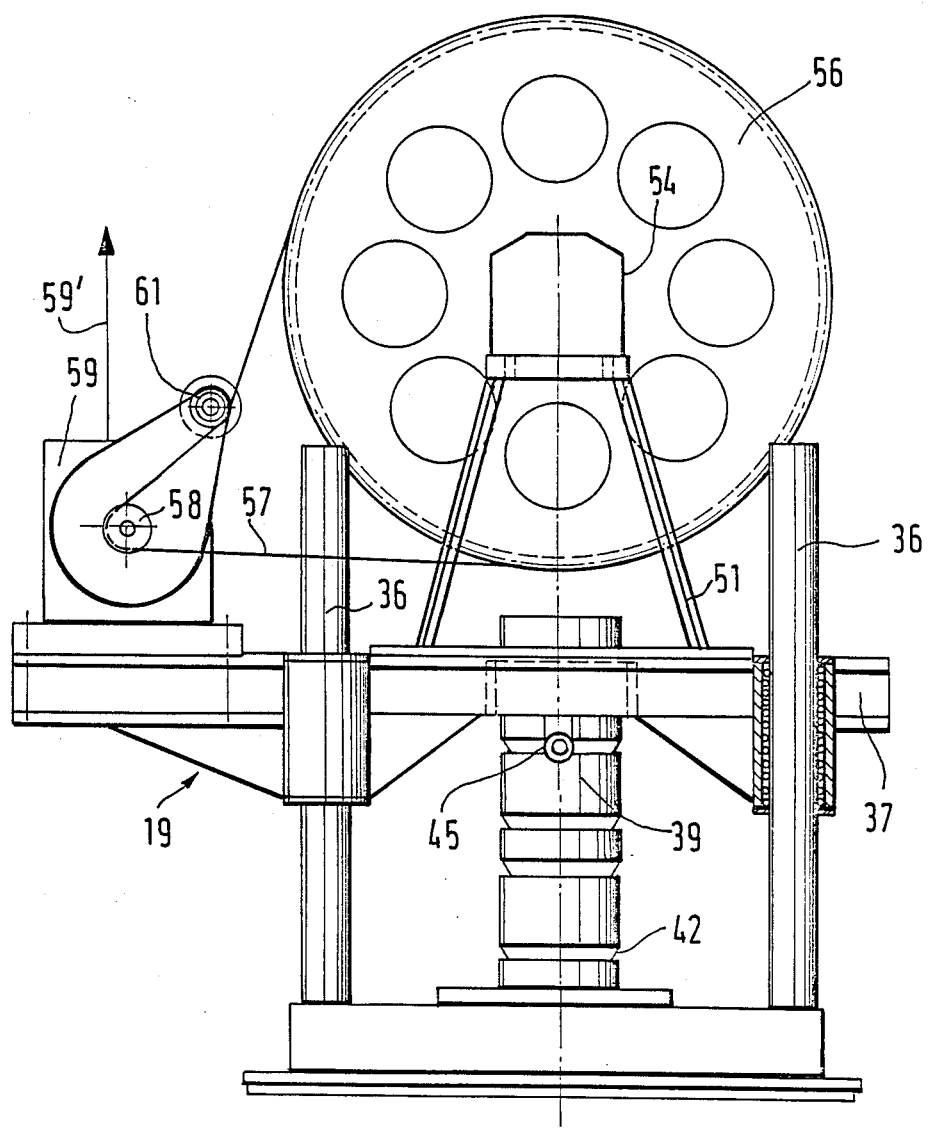
FIG. 2 is an end view in elevation, taken in the direction of the arrow II in FIG. 1.

The apparatus of FIGS. 1 to 5 employs a laser 13 to produce through-cuts (incisions) in semi-cylindrical half-shells 11 and 12, by displacing the laser along a guide 14 parallel to the axis 15 of the half-shells 11 and 12. The guide 14 is vertically above said axis, and laser 13 is longitudinally movable via a lead-screw spindle (not shown) driven by a motor 16. The guide 14 and the motor 16 are supported by a stand 17 arranged behind the apparatus.

The half-shells 11 and 12 consist of plywood. The beam of the laser 13 makes the through-cuts by controlled burning through the half-shells, thereby preparing the half-shells to receive and locate inserted knife elements (not shown). The half-shells 11 and 12 (with assembled knife elements) are then secured upon a roll (not shown). This roll then cooperates with a mating roll so that, in the course of continuous roll rotation, cardboard blanks may be cut out from cardboard sheets passing through the nip between the rolls. Additionally, some of the burned-out cuts can be used for inserted reception and location of tools for the impressed formation of grooves, so that in the rotation process, cardboard blanks can simultaneously be cut and stamped with fold grooves.

To produce the indicated incisions in half-shells 11 and 12 as rapidly and as simply as possible, a hollow carrier shaft 18 is mounted below laser guide 14 between two mounting pedestals, designated generally as 19 and 21 in FIG. 1. To support the bearing shells 11 and 12 in working position, two mounting wheels 22 and 23 are secured to carrier shaft 18, in the vicinity of the respective ends thereof, one mounting wheel 23 being axially displaceable and adapted to be clamped fast on the carrier shaft 18 by means of a clamping device 24 which can be actuated by handles 25, only one of which is shown in the drawing; the clamping device is of known construction, employing a threaded conical frustum, and therefore it need not be shown or described in detail. The rim of each of the mounting wheels 22 and 23 has a flange formation 26 having tapped radial holes to receive screws for retention of half-shells 11 and 12 when mounted to the wheels 22 and 23.

Spaced sets of jack-screw spokes 27, between the mounting wheels 22 and 23 assure further precision in the attachment of shells 11 and 12 to the carrier shaft 18.

The radial web of each mounting wheel is apertured, to reduce moment of inertia; and to isolate the annular intermediate space 28 between half-shells 11 and 12 and the carrier shaft 18, end-cover disks 29 and 31 are provided outside the mounting wheels 22 and 23.

The carrier shaft 18 has radial holes 32 which connect the intermediate space 28 to the hollow interior 33 of the carrier shaft.

The axially displaceable mounting wheel 23, which is connected to the adjacent cover disk 31, is connected to the adjacent end of the carrier shaft 18 via a flexible bellows 30 which surrounds the carrier shaft 18 and serves to lap those radial holes 32 which, depending upon the adjusted longitudinal position of the mounting wheel 23, no longer communicates with the intermediate space 28.

Each of the two mounting pedestals 19 (21) is independently up/down adjustable via hydraulic cylinder means 34 (35), in conjunction with frame structure 37 (38) that is guided in four vertical columns 36.

A column 39 (41) coaxially surrounds each of the cylinders 34 (35), and each column 39 (41) is provided on its outer periphery with detent formations 42. A locking bolt 43 is normally urged by spring means 44 in the direction of detent-locking engagement with its associated column 39 (41); hydraulic-jack action of cylinder 34 (35) causes the detent bolt 43 to be cammed out of locking position, via the inclined slope of the detent formation, and the unlocked position is held by an electromagnet 45. Each locking device, formed by bolt 43, spring 44 and electromagnet 45, is assembled to ring 46 secured to the respective frame structures 37 (38) and surrounding the respective detent columns 39 (41).

The frames 37 (38) of the mounting pedestals 19 (21) provide rotary support for the carrier shaft 18. The rotary mounting of pedestal 19 incorporates a mounting shaft 47 which is rotatable and axially non-displaceable in spaced bearings 48. The bearings 48 are mounted to a platform 49 that is connected by struts 51 to the frame structure 37, and by an adjustable device 52 to the piston rod 53 of hydraulic cylinder 34; the adjustable device 52 serves for precise adjustment of the position of platform 49 with respect to piston rod 53. Platform 49 also carries an incremental angle-measuring transducer 54, which senses angular orientation of the mounting shaft 47, and which supplies in line 54' to a computer 55 an electrical signal output indicative of currently sensed angle. Computer 55 is also connected via line 20' to the electrical-signal output of an incremental length-measuring transducer 20, which output is indicative of the currently sensed longitudinal position of laser 13. Further connections shown to the computer include a line 13' for on/off control of laser 13.

A drive gear wheel 56 on mounting shaft 47 is coupled by a toothed belt 57 (FIG. 2) to the drive pinion 58 of a motor 59, and tensioning roller 61 is shown for tensing the toothed belt 57. A control line 59' connects motor 59 to computer 55, for reception of angle-drive control signals, and a similar control line 16' connects computer 55 to the longitudinal-drive motor 16 for laser 13.

In a manner analogous to platform-49 support at pedestal 19, the piston rod 64 of cylinder 35 is connected via an adjustment device 62 to a bearing housing 68 which is connected to frame structure 38 by struts 60; and a hollow mounting shaft 67 is rotatably mounted to and axially retained by the bearing housing 68. The mounting shaft 67 is the same diameter as the carrier shaft 18, and the end thereof facing away from the carrier shaft 18 is connected via a suction hose 65 (schematically shown) to suction device 66 by means of which smoke products of laser incision through the half-shells 11 and 12 can be exhausted from the intermediate space 28, via the raidal holes 32 and the hollow interior 33 and 63 of the carrier shaft 18 and of the mounting shaft 67.

FIGS. 3 and 4 show detail of the connection of the mounting shaft 47 of the bearing pedestal 19 to the carrier shaft 18. The two shaft ends to be connected are of solid material. A blind axial hole 70 in the end of the mounting shaft 47 is coaxial with the axis of shaft 47; and adjacent thereto, a cylindrical segment 71 is cut out from shaft 47 along a diametral plane 72 and in a radial plane which is aligned with the bottom of the blind hole 70.

For driven connection to the mounting shaft 47, carrier shaft 18 is connected to a coupling 74 of solid material which closes the involved end of the hollow space within carrier shaft 18. This coupling piece 74 has a stub shaft 75 which is coaxial with the carrier shaft and which is provided at its end with a pin formation 76 having substantially the same length and the same diameter as the blind hole 70.

In the rotated orientation shown in FIG. 3, the remaining cylindrical segment 77 of the mounting shaft 47 forms an upwardly open bearing shell for the pin formation 76 of the carrier shaft 18, so that this pin formation can be inserted into the shell from above. If the cylindrical segment 71 which has been cut out is then reinserted and connected to pin 76 in the remaining cylindrical segment 77 by means of a screw 79, one then obtains thereby a very easily detachable fixed rotary connection between the two shaft ends.

At the other longitudinal end of the machine, a similar connection is provided between the hollow end of the carrier shaft 18 and the hollow end of the mounting shaft 67. For this purpose, the corresponding end of the mounting shaft 67 is connected to a coaxial pipe collar 80, and, as in the case of mounting shaft 47, a cylindrical segment 81 is cut out, so that the remaining cylindrical segment 82, in the rotated position of shaft 67 shown in FIG. 1, forms a trough which is upwardly open.

On the pipe collar 80, a displaceably mounted cover sleeve 83 has two circumferential inner grooves 84 and 85 for selective reception of a spring-loaded detent ball 86. The detent ball is so arranged in the pipe socket 80 that the cover sleeve 83 is in its release position (FIG. 5), with the cylindrical segment cutout open, when the carrier shaft 18 is to be inserted from above into the trough formed by the remaining cylinder segment 82. If the cut-out cylindrical segment 81 is then inserted into the cylindrical-segment cutout and the cover sleeve is displaced from the release position into its cover position (i.e., lapping the end of the holding shaft and the remaining cylinder segment, to the point of engaging the detent ball into the second inner groove 84 (FIG. 1)), then the engaged ends of the shafts 18 and 67 are coaxially held together. Upon rotation, they are connected to each other in force-locked manner only by the friction caused by the weight of the carrier shaft, it being noted that a form-locked connection is not necessary, since the connection need only be sufficient to support the carrier shaft and to permit evacuation of the intermediate space 28.

In the modification of FIG. 6, a form-locked connection is shown between the end 90 of a carrier shaft and the adjacent end 91 of a mounting shaft, wherein both shaft ends 90 and 91 are of solid material having the same diameter, it being understood that the same principle applies to two hollow shaft ends when they have the same diameter. Each of the shaft ends 90 and 91 to be connected is characterized by cut-out of a cylindrical segment, so as to leave identical cylinder segments 92 and 93 which engage with their flat diametral surfaces in lapped abutting relation. A cover sleeve 94 corresponding to the cover sleeve 83 can be displaced, between detent-retainable positions, from a release position (FIG. 6) on the shaft end 91 and into a cover position in which it coaxially connects the two shaft ends to each other so that, as a result of the application of the two diametral planes against each other, they are in mutual form-locked engagement.

With the described apparatus, laser incisions can be so made in the half-shells 11 and 12 that the positions of the laser on is path and the angular positions of the carrier shaft 18 (and thus the shells 11 and 12) are measured by the incremental position-sensing transducers, namely, the incremental length-measuring device 20 and the incremental angle-measuring device 54, and the measured values are fed into the computer 55 which will be understood to have been programmed, as appropriate, to coordinate the control of the motors 16 and 59 for the production of incisions of predetermined course.

Advantageously, laser 13 is of a variety which includes a sensor device to track the surface to be machined, with the sensor device providing a control-signal output to assure that the laser maintains a predetermined constant offset distance from the workpiece surface. With such a laser in the described apparatus, it is not only possible to machine cylindrical surfaces but also irregular surfaces and in particular surfaces of rotation having different diameters which are within the adjustment-limit capability of the sensing device.

It will be understood that the output signal of the laser-offset sensor may be fed to computer 55 and that actuating means (not shown) for the cylinders 34 and 35 may include a control connection to computer 55, to enable adapting adjustment not only to the several diameters of work surfaces determined by the detent recesses 42 but also for intermediate values. The detent means (43-44-45) assures, in particular, that if the pressure of pressure fluid in either or both of the cylinders 34 and 35 should suddenly decrease, the mounting pedestals 19 and 21 will not drop to the full extent of the cylinder stroke but will be intercepted by the detent means upon engagement into the next lower detent formation.

Preferably, the force of electromagnet 45 is sufficient to hold bolt 43 in its unlocked position and is not sufficient to pull it out of the locked position, thus avoiding an accident by improper actuation of the electromagnet.

All features mentioned in the above specification as well as all those which can be noted merely from the drawing constitute parts of the invention as further embodiments, even if they have not been particularly emphasized and, in particular, are not mentioned in the claims.

What is claimed is:

1. Laser-machining apparatus comprising a stand having two longitudinally spaced supporting means and longitudinally extending guide means between said supporting means, a laser slidably mounted to said guide means for beam discharge transverse to the longitudinal direction of said guide means, mounting means for supporting a cylindrical-shell workpiece for rotation about its axis, said axis extending longitudinally and being spaced from and parallel to said guide means and said laser-beam discharge being directed toward the outer surface of the workpiece and in the direction toward said axis; said mounting means comprising aligned longitudinally spaced mounting shafts each of which is mounted for rotation in a different one of said supporting means, whereby adjacent ends of said shafts are longitudinally spaced, and workpiece-carrier means adapted for removable positioning in the space between said shafts and connectable to the respective adjacent ends of said shafts; rotary-drive means connected to one of said shafts for common rotation of said mounting shafts and of said work-piece-carrier means; linear-drive means for positioning said laser along said guide means; an incremental length-measuring device for indicating the position of said laser along said guide means, and an incremental angle-measuring device for indicating the angular position of said mounting means about said axis of rotation; and a programmable computer connected to control said linear-drive means and said rotary-drive means in accordance with a given program and as a function of the data of said incremental length-measuring and angle-measuring devices.

2. Apparatus according to claim 1, in which the spacing between said workpiece axis and said guide means is adjustable.

3. Apparatus according to claim 2, characterized by the fact that drive means are provided for adjusting the spacing between said axes in a setting direction.

4. Apparatus according to claim 2, characterized by the fact that detent means are provided for locked retention of selected settings of the spacing between said axes.

5. Apparatus according to claim 4, characterized by the fact that said detent means includes a ring the axis of which is parallel to said setting direction, said ring carrying a bolt which is movable radially to the ring from a locking position in which the bolt engages into a detent recess of a detent carrier, against the force of a spring into an unlocking position in which the bolt is pulled out of the detent recess and in which it can be held by means of an electromagnet.

6. Apparatus according to claim 5, characterized by the fact that said detent carrier comprises a detent column which is coaxial to said ring.

7. Apparatus according to claim 1, in which said computer is connected to coordinate said rotary-drive means and said linear-drive means with on/off control of said laser.

8. Apparatus according to claim 1, in which said carrier means comprises a carrier shaft and connecting means on said carrier shaft for mounting the workpiece to said carrier shaft.

9. Apparatus according to claim 8, characterized by the fact that, to provide mounting surfaces for the ends of said carrier shaft, cylinder segments are cut out in the ends of the said mounting shafts along a surface parallel to the axis of rotation and along a surface forming an angle with them, so that the remaining cylinder segment forms said mounting surface.

10. Apparatus according to claim 9, characterized by the fact that the end of the mounting shaft to which the rotary-drive means is connected and the adjacent end of the carrier shaft are both of solid material, that a blind hole coaxial to the axis of the mounting shaft is so arranged in the shaft end that the remaining cylinder segment forms a mounting shell which is open toward the diametral plane, and that at the adjacent end of the carrier shaft an axially locating pin is provided for engagement in the mounting shell, said pin being coaxial with the axis of the carrier shaft, and the diameter of said pin being equal to the diameter of the blind hole.

11. Apparatus according to claim 10, characterized by the fact that, for the transmission of the moment of rotation, the pin and the remaining cylinder segment are connected to each other by a drive pin.

12. Apparatus according to claim 11, characterized by the fact that the cutout cylinder segment fills the cutout and is connected to the involved shaft ends by means of the drive pin.

13. Apparatus according to claim 9, characterized by the fact that, at least at one end of the carrier shaft, the two shaft ends to be connected to each other are hollow, that the inner diameter of the mounting-shaft end is equal to the outer diameter of the carrier-shaft end so that the remaining cylinder segment of the mounting shaft forms a mounting shell for the carrier shaft end, and that the cut-out cylinder segment fills the recess and is held in the recess by an axially displaceable and lockable cover sleeve.

14. Apparatus according to claim 13, characterized by the fact that the cover sleeve has two circumferential inner grooves for engagement by a spring-actuated detent to determine two spaced positions in which the cover sleeve can be detachably locked, said detent being arranged in the shaft end which carries the cover sleeve in its release position.

15. Apparatus according to claim 9, characterized by the fact that the end of the mounting shaft and the end of the carrier shaft to be connected to it have the same outer diameter and that the same cylinder segment is cut out on the carrier-shaft end so that each remaining cylinder segment of said one shaft end is engageable in the cylinder-segment recess of the other shaft end.

16. Apparatus according to claim 15, characterized by the fact that a cover sleeve on at least one shaft end is axially displaceable from a release position surrounding the two adjoining shaft ends, and back.

17. Apparatus according to claim 16, characterized by the fact that the cover sleeve has two circumferential inner grooves for the engagement of a spring-actuated detent, said detent being arranged in that shaft end which carries the cover sleeve in its release position and by means of which the cover sleeve can be detachably locked in its two positions.

18. Apparatus according to claim 1, characterized by the fact that two mounting wheels are provided as connecting means for mounting the shell-shaped body on the carrier shaft.

19. Apparatus according to claim 18, characterized by the fact that at least the one mounting wheel is mounted for axial displacement in lockable manner on the carrier shaft.

20. Apparatus according to claim 18, characterized by the fact that between said mounting wheels there is at least one additional mounting for the mounting of the shell-shaped member.

21. Apparatus according to claim 20, characterized by the fact that said additional mounting is formed by radial spokes.

22. Apparatus according to claim 1, characterized by the fact that the carrier shaft is driven via one end to the exclusion of its other end, and that at least said other end and the mounting shaft connected thereto are hollow.

23. Apparatus according to claim 22, characterized by the fact that said carrier shaft has plural spaced openings, whereby the hollow space of the carrier shaft communicates with outer space via said radial openings, and that said other end the connected hollow spaces of the carrier shaft and of the mounting shaft are connected to a suction device.

24. Apparatus according to claim 23, characterized by the fact that at least the axially displaceable mounting wheel is connected to a bellows which surrounds the carrier shaft for the effective closing of any radial openings which are exposed on the side of the carrier shaft facing away from the other mounting wheel.

25. Laser-machining apparatus comprising a stand having longitudinally extending guide means, a laser slidably mounted to said guide means for beam discharge transverse to the longitudinal direction of said guide means, mounting means including an aperture tubular carrier shaft for supporting a cylindrical-shell workpiece for rotation about a workpiece axis which is spaced from and parallel to the longitudinal direction of said guide means and with said laser-beam discharge directed toward the outer surface of the workpiece and in the direction of the workpiece axis, spaced wheels on said carrier shaft for supporting the workpiece in radially spaced relation from the carrier shaft, rotary-drive means for rotating the workpiece, linear-drive means for positioning said laser along said guide means, means including a programmable computer connected to coordinate said rotary-drive means with said linear-drive means and with on/off control of said laser, and the beam discharge of said laser being of sufficient strength to burn through the workpiece shell to thereby machine a computer-controlled program of predetermined slot development in the workpiece, and means including a suction device communicating with the interior of said carrier shaft for externally exhausting residual products of burning through the workpiece.

* * * * *